UNITED STATES PATENT OFFICE.

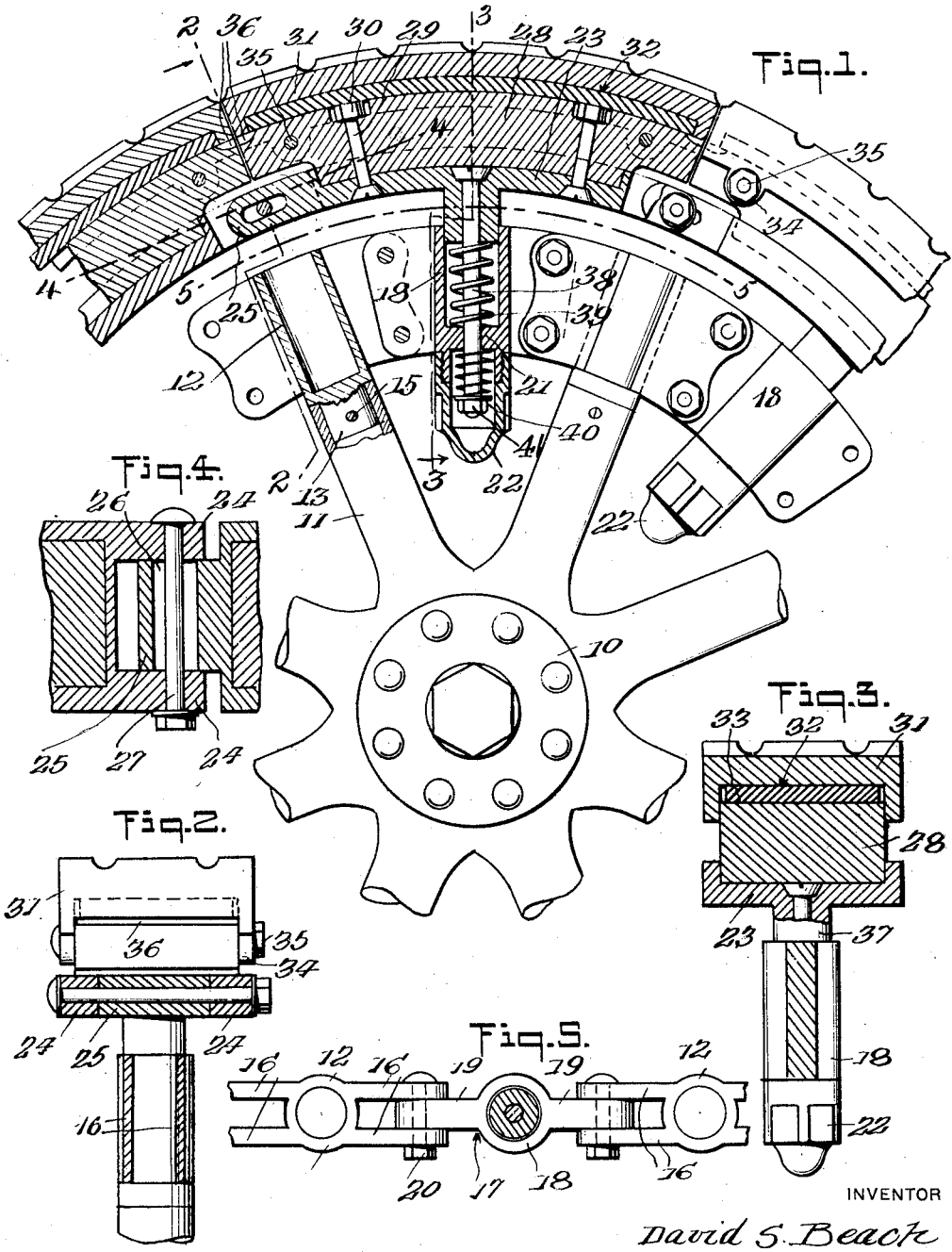

DAVID S. BEACH, OF BRIDGEPORT, CONNECTICUT.

RESILIENT WHEEL.

1,343,898.  Specification of Letters Patent.  Patented June 22, 1920.

Application filed May 4, 1918. Serial No. 232,528.

*To all whom it may concern:*

Be it known that I, DAVID S. BEACH, a citizen of the United States, residing at Bridgeport, in the county of Fairfield and State of Connecticut, have invented certain new and useful Improvements in Resilient Wheels, of which the following is a specification.

This invention has relation to resilient wheels for motor vehicles, and the nature and objects will be readily apparent to those skilled in the art to which this invention appertains in the light of the following description of what I deem to be the preferred construction of my invention from among other forms and arrangements within the spirit of the invention and the scope of the appended claims.

The object of the invention is to provide a resilient wheel for motor vehicles including a rim formed of a plurality of relatively movable sections, and resilient means connecting the sections to the felly of a wheel.

Another object of the invention is to provide a resilient wheel embodying a sectional felly, alternate members of which carry a spring casing, and a rim formed of a plurality of sections connected for relative movement, and means on each rim section extending into the spring casing of an adjacent felly section whereby to resiliently resist radial movement of the rim section in contact with the ground.

A still further object of the invention is to provide a resilient wheel of the character above set forth which will be simple in construction consistent with the functions to be performed, and which can be economically manufactured.

In addition to the foregoing this invention comprehends improvements in the details of construction and arrangements of parts to be hereinafter set forth and specifically pointed out in the appended claims.

In the accompanying drawings in which similar and corresponding parts are designated by the same characters of reference;

Figure 1 is a fragmentary view in elevation, partly in section of a resilient wheel constructed in acordance with my invention, Figs. 2, 3 and 4 are detail sections taken on the lines 2—2, 3—3, and 4—4 of the preceding figure, and Fig. 5 is a horizontal detail section taken on the line 5—5 of Fig. 1.

With reference to the drawings, 10 indicates generally the hub of a vehicle wheel of the type including tubular radial spokes 11. The felly consists of a plurality of sections or castings 12, each of which has a cylindrical central portion terminating at its inner end in a projection 13 designed to enter the outer end of one of the spokes. A set screw 15 may be inserted in the spoke to penetrate the projection 13 to secure the casting in place. Each casting 12 is formed with oppositely extending pairs of ears 16 formed with openings adjacent their outer ends and located between each pair of castings 12 is a casting 17 having a spring housing 18 formed at its intermediate portion and oppositely extending ears 19 formed therewith for insertion between the ears 16. Bolts 20 are used to secure the castings 12 and 17 together throughout the circumference of the wheel, said bolts passing through the alined openings of ears 16 and 19 as shown. These castings 12 and 17 when connected define a continuous annular felly having a circular outer periphery. The spring housings 18 are in each instance formed with a transverse septum 21, centrally apertured, and the inner end of the housing is reduced and threaded to receive a cap 22.

The rim comprises a plurality of segmental blocks or sections, each section including an arcuate inner plate 23 disposed adjacent the outer surface of the felly and curved so as to be concentric to the center of the wheel. Each plate is formed with a pair of spaced lugs 24 at one end, suitably apertured as indicated, and the plate is reduced at its other end to define a lug 25 having a circumferentially elongated opening 26, said lug 25 entering the space between the lugs 24 of an adjacent section or plate. A bolt 27 enters the openings of the lugs 24 and the opening 26 of the lug 25 to secure the plates against separation but to permit slight relative movement therebetween. Each plate is formed with a recess in its outer face to receive the reduced portion of a block 28 which is arcuate in configuration and is of a length to extend from a point coincident with the projected radial center line of one spoke to the center line of the next spoke as shown in Fig. 1, a slight clearance being permitted between the ends of said blocks. Bolts 29 are used for connecting the plates 23 and blocks 28 together, the nuts 30 applied to the bolts being located in recesses formed in the outer faces of the blocks 28 to provide a smooth outer surface. Each rim section furthermore includes an outer arcuate plate 31 having a recess 32 in its underface to receive a strip of rubber 33 or similar cushioning material. The sides of the plates 31 extend radially and overlap the sides of the blocks 28 as shown in Fig. 3, and apertured ears 34 are provided on the flanges to receive bolts 35 which are inserted in transverse openings in the blocks 28 to secure the plates 31 and said blocks 28 together. The openings in the blocks 28 which receive the bolts 35 should be slightly larger than the bolts so as to permit slight movement of the plates 31, and to this end the ends of the blocks 28 are cut away adjacent their upper surfaces as at 36. The outer surfaces of the plates 31 may be formed with a tread formation of rubber or other desired material of any desired type. Each inner plate 23 is formed with a radial extension 37 of preferably cylindrical formation to enter the spring casing 18 of an adjacent felly section. A bolt 38 is inserted in the extension 37 and the same enters the central opening of the septum 21 and extends therebeyond. A relatively heavy coiled spring 39 is encompassed about the bolt 38 and is interposed between the septum and the extension 37. A washer 40 is applied to the inner end of the bolt and secured in place by means of a nut 41. A light coiled spring 42 is then encompassed about the bolt and interposed between the washer and the septum.

In operation it will be seen that as each block or section of the rim contacts with the road bed said section is moved radially toward the center of the wheel against the tension of the heavy spring 39. The connection between the sections of the rim should be sufficient to permit this movement. In practice however, the movement of the sections is intended to be very slight since the supporting springs 39 are designed with a view to supporting the weight of the car without excessive deflection. The light spring 42 is intended merely to expand as the bolt 38 moves inward and thus take up lost motion. It will be seen that the strips 33, one of which is located in each rim section also acts materially to absorb road shocks.

While I have illustrated and described my invention with some degree of particularity, I realize that in practice various alterations may be made in the structure set forth above. I therefore reserve the right and privilege of changing the form of details of construction, or the arrangement of the correlative parts without departing from the spirit of the invention or the scope of the appended claims.

Having thus described my invention what I claim as new and desire to secure by Letters Patent is:—

1. A resilient wheel including a felly, spokes and hub section, a plurality of radial spring housings carried by the felly, a perforated septum within each housing, a cap inclosing the inner end of each housing, a rim section comprising a plurality of segmental blocks, a radial extension on the inner face of each block to enter an associated spring housing, a bolt extending from each radial extension for insertion in the septum, a nut applied to the inner end of each bolt, a relatively stout coiled spring embracing each bolt and engaging the septum and radial extension, and a light coiled spring embracing each bolt and engaging the septum and nut.

2. In a resilient wheel, a felly comprising a plurality of disconnectible sections, a spring housing carried by each alternate section, a rim section comprising a plurality of blocks, a radial extension on each block to enter an associated spring housing, and resilient means within each housing to resist movement of the blocks.

3. In a resilient wheel, a hub section, spokes radiating therefrom, a felly comprising a plurality of sections, means mounting alternate sections on said spokes, means connecting the remaining sections to the spoke carried sections, a spring housing carried by each last mentioned section, a rim including a plurality of blocks, a radial extension on each block to enter an associated spring housing, and means in each housing to resist movement of the blocks.

4. In a resilient wheel, a hub, spokes radiating therefrom, a felly including a plurality of circumferentially arranged sections, means mounting alternate sections upon the spokes, means connecting the sections together, spring housings carried by alternate sections, a rim including a plurality of blocks, a radial extension on each block to enter an associated spring housing, and means in each housing to resist radial movement of the blocks.

5. In a resilient wheel, a hub, radial tubular spokes, a felly including a plurality of sections, inner radial projections on alternate sections to enter the spokes, means connecting said projections to the spokes, means connecting the sections together, spring housings carried by alternate sections, a rim including a plurality of blocks, radial extensions on the blocks to enter the housings, and resilient means within the housings resisting radial movement of the blocks.

6. In a resilient wheel including a felly, a rim section formed of a plurality of segments, each segment comprising an inner plate, a block mounted thereupon, a tread plate superposed upon the block, means connecting the tread plate to the block for slight relative movement, and a layer of cushioning material interposed between the block and tread plate.

7. In a resilient wheel, a felly comprising a plurality of sections, each alternate section comprising a cylindrical portion having a pair of spaced ears leading from each side thereof, each cylindrical portion having a projection leading from its inner end, the remaining sections each having a central spring housing, and said spring housings each having a single ear leading from each side thereof and fitting between the spaced ears of the first mentioned sections, means passing through said ears for connecting the sections together, a hub having spokes connected to said projections, and a rim having extensions passing into said spring housings.

8. In a resilient wheel, a felly comprising a plurality of sections, alternate sections having parallel spaced ears, the remaining sections having single ears, the ears of the last mentioned sections fitting between the parallel ears of the first mentioned sections, means connecting said ears together, whereby the sections are secured to each other, a hub having spokes, a rim, and means connecting said spokes and said rim to the sections of said felly.

9. In a resilient wheel, a felly comprising a plurality of sections, alternate sections comprising central cylindrical portions having a pair of spaced ears leading from each side of each cylindrical portion, each cylindrical portion having a projection leading from its inner end, the remaining sections having single ears leading therefrom and fitting between the spaced ears of the first mentioned sections, means passing through said ears for connecting the sections together, a hub having spokes connected to said projections, a rim, and means for connecting said rim to said felly.

10. In a resilient wheel, a felly comprising a plurality of sections, alternate sections having pairs of spaced ears, the remaining sections each having a central spring housing having an ear leading from each side thereof and fitting between the spaced ears of the first-mentioned sections, means passing through said ears for connecting the sections together, a hub having spokes, means connecting the spokes to the first mentioned sections, and a rim having extensions passing into said spring housings.

11. A resilient wheel including a felly, a plurality of spring housings carried by said felly, a septum in each housing, a rim section formed of a plurality of segmental members, radial extensions on said members for reception in said spring housings, and a spring mounted on each extension on each side of said septum.

In testimony whereof I, DAVID S. BEACH, affix my signature in presence of two witnesses.

DAVID S. BEACH.

Witnesses:
MARGARET L. HUGHES,
ANNE J. HUGHES.